(12) United States Patent
Venkataramani et al.

(10) Patent No.: US 11,580,384 B2
(45) Date of Patent: Feb. 14, 2023

(54) SYSTEM AND METHOD FOR USING A DEEP LEARNING NETWORK OVER TIME

(71) Applicant: GE Precision Healthcare LLC, Wauwatosa, WI (US)

(72) Inventors: Rahul Venkataramani, Bangalore (IN); Sai Hareesh Anamandra, Bangalore (IN); Hariharan Ravishankar, Bangalore (IN); Prasad Sudhakar, Bangalore (IN)

(73) Assignee: GE Precision Healthcare LLC, Wauwatosa, WI (US)

( * ) Notice: Subject to any disclaimer, the term of this patent is extended or adjusted under 35 U.S.C. 154(b) by 795 days.

(21) Appl. No.: 16/522,367

(22) Filed: Jul. 25, 2019

(65) Prior Publication Data

US 2020/0104704 A1 Apr. 2, 2020

(51) Int. Cl.
*G06N 3/08* (2006.01)
*G06T 7/00* (2017.01)
*G06N 3/04* (2006.01)

(52) U.S. Cl.
CPC .............. *G06N 3/08* (2013.01); *G06N 3/04* (2013.01); *G06T 7/0012* (2013.01)

(58) Field of Classification Search
CPC ........... G06N 3/08; G06N 3/04; G06T 7/0012
See application file for complete search history.

(56) References Cited

U.S. PATENT DOCUMENTS

| | | | |
|---|---|---|---|
| 10,055,685 B1 | 8/2018 | Arel et al. | |
| 10,162,794 B1 | 12/2018 | Arel et al. | |
| 2016/0140425 A1* | 5/2016 | Kulkarni | G06V 30/194 |
| | | | 382/159 |
| 2016/0299755 A1 | 10/2016 | Yang et al. | |
| 2017/0032165 A1* | 2/2017 | Hansen | G06V 40/1335 |
| 2017/0032222 A1* | 2/2017 | Sharma | G06V 10/449 |
| 2017/0344829 A1* | 11/2017 | Lan | G06N 3/08 |
| 2018/0005070 A1* | 1/2018 | Lin | G06N 3/0454 |
| 2018/0232601 A1* | 8/2018 | Feng | G06V 10/82 |
| 2018/0247193 A1* | 8/2018 | Holtham | G06N 3/0454 |
| 2018/0276560 A1* | 9/2018 | Hu | G06N 20/00 |
| 2019/0034798 A1 | 1/2019 | Li et al. | |
| 2019/0061147 A1 | 2/2019 | Luciw | |

OTHER PUBLICATIONS

Santoro, Adam, et al.; "Meta-learning with memory-augmented neural networks", ICML'16 Proceedings of the 33rd International Conference on International Conference on Machine Learning, vol. 48, pp. 1842-1850, Jun. 19-24, 2016.

(Continued)

*Primary Examiner* — Bobbak Safaipour
*Assistant Examiner* — Duy Tran
(74) *Attorney, Agent, or Firm* — Fletcher Yoder P.C.

(57) ABSTRACT

The present approach relates to a system capable of life-long learning in a deep learning context. The system includes a deep learning network configured to process an input dataset and perform one or more tasks from among a first set of tasks. As an example, the deep learning network may be part of an imaging system, such as a medical imaging system, or may be used in industrial applications. The system further includes a learning unit communicatively coupled to the deep learning network 102 and configured to modify the deep learning network so as to enable it to perform one or more tasks in a second task list without losing the ability to perform the tasks from the first list.

20 Claims, 7 Drawing Sheets

(56) References Cited

OTHER PUBLICATIONS

Rusu, Andrei A., et al.; "Progressive Neural Networks", arXiv preprint arXiv:1606.04671, Sep. 7, 2016.
Kirkpatrick, James, et al.; "Overcoming catastrophic forgetting in neural networks", Proceedings of the national academy of sciences, Jan. 25, 2017.
Li, Zhizhong, et al.; "Learning without Forgetting", IEEE Transactions on Pattern Analysis and Machine Intelligence, Feb. 14, 2017.
Rebuffi, Sylvestre-Alvise, et al.; "iCaRL: Incremental Classifier and Representation Learning", In Proc. CVPR, Apr. 14, 2017.
Zenke, Friedemann, et al.; "Continual Learning Through Synaptic Intelligence", arXiv preprint arXiv:1703.04200, Jun. 12, 2017.
Lopez-Paz, David, et al.; "Gradient Episodic Memory for Continual Learning", In Advances in Neural Information Processing Systems, pp. 6467-6476, 2017.
Li, Yu, et al.; "SupportNet: solving catastrophic forgetting in class incremental learning with support data", ICLR 2019 International Conference on Learning Representations, Sep. 28, 2018.
Maltoni, Davide, et al.; "Continuous Learning in Single-Incremental-Task Scenarios", arXiv preprint arXiv:1806.08568, Jan. 22, 2019.
Parisi, German I., et al.; "Continual lifelong learning with neural networks: a review", Neural Networks, vol. 113, pp. 54-71, May 2019.
Ravishankar et al., "Feature Transformers: a Unified Representation Learning Framework for Lifelong Learning", Under review as a conference paper at ICLR 2019, 2019.
PCT application PCT/US2019/053536 filed Sep. 27, 2019, International Search Report-Written Opinion dated Jan. 8, 2020, 11 pages.

\* cited by examiner

| S.No | Base feature extraction layer | Validation accuracy |
|---|---|---|
| 1 | block3_pool | 86.94% |
| 2 | block4_pool | 85.84% |
| 3 | fc_1 | 84.6% |
| 4 | fc_2 | 83.2% |

SYSTEM AND METHOD FOR USING A DEEP LEARNING NETWORK OVER TIME

CROSS-REFERENCE TO RELATED APPLICATION

This application claims priority to and the benefit of Indian Patent Application No. 201841036423, entitled "SYSTEM AND METHOD FOR LIFELONG LEARNING", filed Sep. 27, 2018, which is herein incorporated by reference in its entirety.

BACKGROUND

Embodiments of the present specification relate generally to deep learning network, and more particularly to systems and methods for life-long learning.

Deep learning systems are being increasingly used to address real world problems, such as analysis of multidimensional medical image datasets, knowledge discovery in massive biological data, adaptive speech recognition, adaptive intelligent prediction and control systems, artificial intelligent based industrial systems capable of adaptation and learning, and so forth. Such systems are configured to learn in a specific context for a given training dataset. Typically, deep learning networks are based on artificial neural networks and the learning algorithms are based on multi-layer perceptrons (MLP) and backpropagation techniques.

However, established neural network and artificial intelligence (AI) techniques have difficulties when applied to on-line knowledge based learning. In many scenarios, conventional deep learning algorithms lack the ability to learn continually after deployment. In other situations, the requirements for incrementally adapting the deep learning networks with more data from the same task or to learn new tasks from old or new datasets are not met adequately.

Conventionally, techniques of rehearsal replaying information from the previous tasks may be employed to retrain the neural network for newer scenarios. However, such techniques require excessive and ever increasing data storage capacity, which may be prohibitive in domains such as healthcare and industrial applications. Further, rehearsal replaying also demands higher computational capacity and requires longer training duration for generating adapted learning networks. While fixed feature representation learning retrains the classification layers, incrementally evolving representation learning techniques are aimed at evolution of the network with newer tasks and datasets.

However, naive methods of retraining the deep learning network result in failures where the network forgets the previous tasks for which they were initially designed. Attempts to pseudo-replay with generation of old data representation through simulations have been made to avoid failure of naive learning and to mimic the rehearsal replaying without the need to store the old dataset. However, performance of these methods is still far from the baseline method (complete retraining) and requires further improvement. Other hybrid techniques propose storage of a part of the old dataset and use of data models to generate pseudo data to supplement the part of the old dataset that is not stored. Additionally, the neural networks constrained using regularization techniques are employed with conventional and hybrid techniques with limited performance enhancements. However, none of these approaches is fully satisfactory in terms of performance and/or flexibility.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the invention may encompass a variety of forms that may be similar to or different from the embodiments set forth below.

In accordance with an aspect of the present technique a system capable of life-long learning is disclosed. In certain implementations the system includes a deep learning network configured to perform at least one task from a first task list and learning unit communicatively coupled to the deep learning network and configured to update the deep learning network for performing at least one task from a second task list. In one embodiment, the learning unit includes a dataset generator communicatively coupled to the deep learning network and configured to receive a first set of parameters corresponding to a first training dataset. The first set of parameters in one such implementation include a first feature extractor and a first classifier. The dataset generator is further configured to receive a second training dataset corresponding to a second set of tasks. The dataset generator is also configured to receive a first feature set determined based on the first training dataset and the first feature extractor. The learning unit further includes a feature transformer unit communicatively coupled to the dataset generator and configured to determine an intermediate feature set based on the first feature extractor and the second training dataset. The feature transformer unit is further configured to train the feature transformer based on the intermediate feature set, the first feature set, and the second training dataset. The learning unit also includes a deep learning network generator communicatively coupled to the feature transformer unit.

In one embodiment, a method is provided for updating a deep learning network over time. In accordance with one such embodiment, the method includes the steps of receiving a first set of parameters from a deep learning network. The deep learning network is trained using a first training dataset to perform a first set of tasks. The first set of parameters specify one or both of a first feature extractor and a first classifier used to perform the first set of tasks. A first feature set corresponding to the first training dataset and an input comprising a second set of tasks and a second training dataset are also received. A second set of parameters is generated that specify one or both of a second feature extractor and a second classifier for use by the deep learning network. The second set of parameters are generated using the first set of parameters, the input, and the first feature set. The deep learning network is modified to use the second set of parameters so that the deep learning network is trained to perform tasks from the first set of tasks and the second set of tasks without degradation.

In a further embodiment, a system is provided. In accordance with this embodiment, the system comprises a deep learning network initially trained using a first training dataset to perform a first set of tasks and a learning unit in communication with the deep learning network. The learning unit comprises one or more memory components storing data and computer logic and one or more processors configured to execute computer logic stored on the one or more memory components. The computer logic, when executed, causes acts to be performed comprising: receiving a first set of parameters from the deep learning network, wherein the first set of parameters specify one or both of a first feature extractor and a first classifier used to perform the first set of tasks; receiving a first feature set corresponding to the first training dataset; receiving an input comprising a second set of tasks and a second training dataset; generating a second set of parameters specifying one or both of a second feature extractor and a second classifier for use by the deep learning network, wherein the second set of parameters are generated using the first set of parameters, the input, and the first feature set; and modifying the deep learning network to use the second set of parameters so that the deep learning network is trained to perform tasks from the first set of tasks and the second set of tasks without degradation.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

As will be described in detail hereinafter, systems and methods for deep learning networks are presented. More particularly, the systems and methods presented in the present specification relate to life-long learning in the context of deep learning networks. Further, the systems and the methods described provide a unified representation framework for a life-long learning framework.

The phrase 'life-long learning' as used herein refers to learning techniques for performing already learned tasks with recently acquired data or acquiring the ability to perform newer tasks (i.e., tasks not previously learned) with newer or previously acquired data. The phrase 'training dataset' refers to a plurality of combinations of input and corresponding output data that may be used in implementing learning techniques. The phrase 'feature extractor' refers to an operator applied on input data vectors to determine a corresponding feature vector. The phrase 'classifier' or 'neural network classifier' refers to an operator applied on the output of the feature extractor to generate a classification label. The phrase 'deep learning network' may refer to a neural network based learning network and is defined in terms of a 'first set of parameters' while configured to perform a task from a first task list and a 'second set of parameters' while configured to perform a task from a second task list.

As discussed herein, a neural network classifier, parameterized by $(\theta, \kappa)$, is a composition of a feature extractor $\Phi_\theta: X \to F$ and $\Psi_\kappa$, a classifier $\Psi_\kappa \circ \Phi_\theta: X \to [C]$; where X is the space of input data, and F is a space of low-dimensional feature vectors. In a lifelong learning setup, at any time $t-1$, the model optimally classifies all of the seen data $\cup_{t'=0}^{t-1} X^{(t')}$ into the classes $[C^{(t-1)}]$ and the corresponding features $F^{(t-1)}$ are well separated. At t, when new training data $D^{(t)} = (X^{(t)}, Y^{(t)})$ is encountered, features extracted using the old feature extractor are not guaranteed to be optimized for classifying the new data and new classes. To alleviate this, the present approach discussed herein changes the feature representation at time t, prior to the classification stage. This is achieved by defining a feature transformer $\Phi_{\Delta\theta^{(t)}}: F^{(t-1)} \to F^{(t)}$ parameterized by $\Delta\theta^{(t)}$, which maps any feature extracted by $\Phi_{\theta^{(t-1)}}$ to a new representation. The new feature extractor is now given by $\Phi_{\theta^{(t)}} \triangleq \Phi_{\Delta\theta^{(t)}} \circ \Phi_{\theta^{(t-1)}}$ where $\theta^{(t)} \triangleq \theta^{(t-1)} \cup \Delta\theta^{(t)}$. Practically, this may be realized by augmenting the capacity of the feature extractor using dense layers (e.g., fully connected layers), as discussed in greater detail below.

Figure 1:
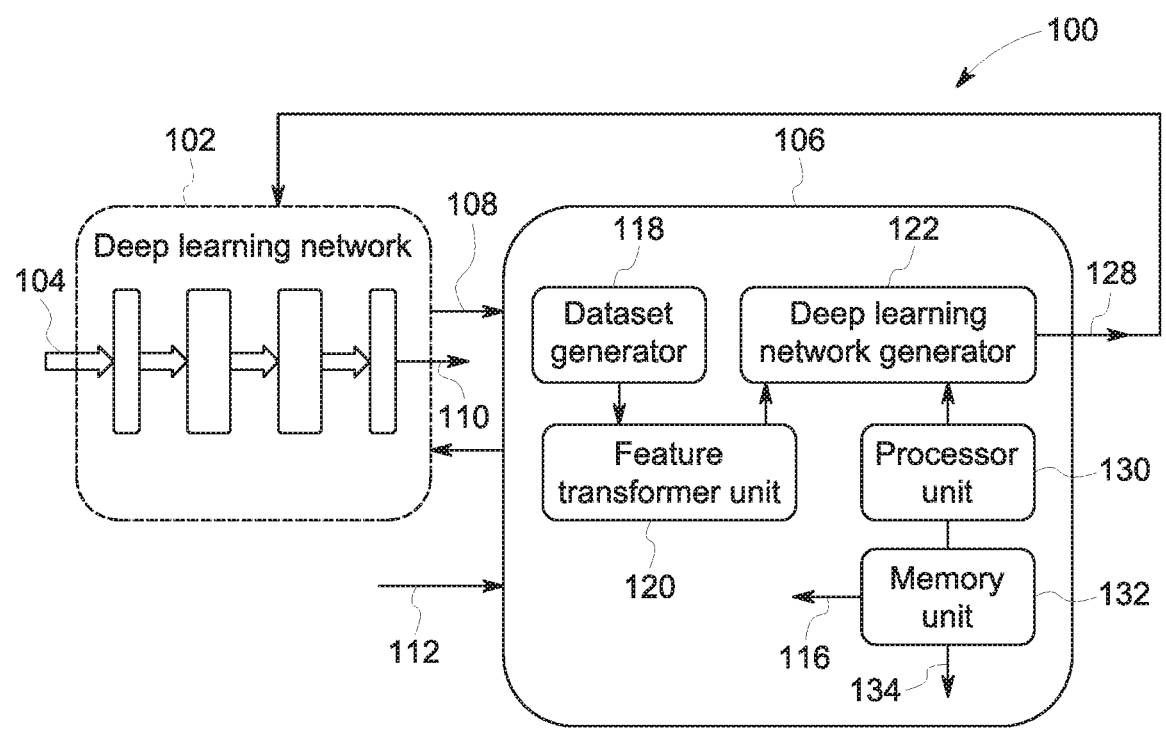
FIG. 1 is a diagrammatic illustration of a system for life-long learning in accordance with aspects of the present specification.

With the preceding discussion in mind, FIG. 1 is a diagrammatic illustration of a system 100 capable of life-long learning in accordance with aspects of the present specification. The system 100 includes a deep learning network 102 configured to process an input dataset 104 and perform one or more tasks from among a first set of tasks. In one embodiment, the deep learning network 102 is a memory augmented neural network (MaNN). The deep learning network 102 in one such example includes a first set of parameters 108 (e.g., weights or other learned parameters or values) generated from a first training dataset that corresponds to a first task list. In this example, the first set of parameters 108 includes, specifies, or configures a first feature extractor and a first classifier. Further, a first feature set 116, generated based on the first training dataset and the first feature extractor, is stored in a memory location either within the MaNN or in a separate memory location. As an example, the deep learning network 102 may be part of an imaging system, such as a medical imaging system, with diagnosing capability. In one embodiment of such an example, the deep learning network 102 is configured to process X-ray images used as input dataset 104 to determine a pneumothorax condition output (i.e., a diagnostic or clinical output 110). In an alternative embodiment, image datasets acquired from a computer tomography (CT) machine or a magnetic resonance imaging (MM) machine may be used as inputs 104 to generate outputs 110 that convey or indicate one or more medical conditions such as, but not limited to, artery diseases, neurological problems, and condition of vital organs. The system of 100 may also be used in industrial applications such as, but not limited to, preventive maintenance of a fleet of machines, turbines and aircraft engines. The system 100 further includes a learning unit 106 communicatively coupled to the deep learning network 102 and configured to modify the deep learning network 102 so as to enable it to perform one or more tasks in a second task list (e.g., new task or task for which the deep learning network 102 was not previously trained) without losing the ability to perform the tasks from the first list.

The deep learning network 102 may be implemented using CPUs (Central Processing Units) such as Core i7 from INTEL and Ryzen from AMD, or GPUs (Graphic Processing Units) such as NVIDIA GTX and 1080 Ti. Alternatively, the deep learning network 102 may be implemented using FPGAs (Field-Programmable Gate Arrays) and/or ASICs (Application-specific Integrated Circuits) such as a TPU (Tensor Processing Unit) from GOOGLE. In alternative embodiments, the deep learning network 102 of the present specification may also be implemented using mobile processors having special instructions, optimized DSPs, and dedicated NPUs (Neural Processing Units). In other embodiments, the deep learning network 102 may be implemented using energy efficient neuromorphic architectures with or without memristors or using Quantum Computers (QC).

In one embodiment, the learning unit 106 is configured to receive the first set of parameters 108 from the deep learning network 102, and an external input 112 such as, but not limited to, a second training dataset and a second task list selected or specified by an operator. In embodiments when the deep learning network 102 is a MaNN, the learning unit 106 may be further configured to receive the first feature set 116 corresponding to the first training dataset. The learning unit 106 is further configured to generate a second set of parameters 128 (e.g., weights or other learned parameters or values) for use by the deep learning network 102 that is based on the first set of parameters 108, the external input 112 and the first feature set 116. For example, in one embodiment the second set of parameters 128 includes, specifies, or configures a second feature extractor and a second classifier. The learning unit 106 is further configured to modify the deep learning network 102 using the second set of parameters 128. In one embodiment, the first training dataset and the second training dataset may have same probability distribution and the second task list may be same as the first task list. In another embodiment, the probability distribution of the second training dataset may be different from the probability distribution of the first training dataset. In a further embodiment, the second task list may be different from the first task list and the second training dataset may have a different distribution compared to that of the first training dataset. In all of these canonical scenarios, the second set of parameters 128 enables the deep learning network 102 to perform the tasks from the first task list trained using the first training dataset without degradation, i.e., the deep learning network retains it training to perform the tasks of the first task list without degradation.

The learning unit 106 may be configured to generate a second feature set and subsequently store the second feature set in the memory unit 116. In an alternate embodiment, the learning unit 106 is configured to store the first feature set 116 within an internal memory location and use the first feature set 116 for generating the second set of parameters 128. In the depicted example, the learning unit 106 includes a dataset generator unit 118, a feature transformer unit 120 and a deep learning network generator 122. The depicted learning unit 106 also includes a memory unit 132 and a processor unit 130 communicatively coupled to the other units 118, 120, 122 via a communications bus 134 and/or otherwise implementing the other units 118, 120, 122, such as via one or more stored and executable routines or program logic.

The dataset generator unit 118 in this example is communicatively coupled to the deep learning network 102 and configured to receive a first set of parameters 108 from the deep learning network 102. In one implementation, the first set of parameters 108 is generated at a first time instant using the first training dataset. The dataset generator 118 is also configured to receive the first feature set 116 corresponding to the first training dataset either from a memory location within the deep learning network 102 or from a memory location in memory unit 132 associated with the learning unit 106. The dataset generator 118 is also configured to receive the second training dataset corresponding to a second task list via the external input 112. The dataset generator 118 may be further configured to receive a first feature extractor determined a priori and stored in the memory unit 132. In one implementation, the dataset generator 118 is configured to generate an intermediate feature set based on the first feature extractor and the second training dataset. Specifically, in one example the intermediate feature set is given by:

$$\partial F^{(t)} = \cup_{\tau \in \tau^{(t)}} (\Phi_{\theta^{(t-1)}}(X_\tau^{(t)})) \qquad (1)$$

where $\Phi_{\theta^{(t-1)}}$ is a first feature extractor corresponding to the first set of parameters 108, $\partial F^{(t)}$ is the intermediate feature set, $X_\tau^{(t)}$ is the input data of the second training dataset and $\cup_{\tau \in \tau^{(t)}}$ is representative of a union operation over the second task list. Further, the dataset generator 118 may be configured to generate the second training dataset based on the first feature set and the intermediate feature set as given by:

$$D^{(t)} = (\partial F^{(t)} \cup F^{(t-1)}, \cup_{t' \in [1,2,\ldots,t]} Y^{(t')}), \forall t > 0 \qquad (2)$$

where, $D^{(t)}$ is the second training data set, $\partial F^{(t)}$ is the intermediate feature set, $F^{(t-1)}$ is the first feature set, $\cup$ is a set union operator and $\cup_{t'} Y^{(t')}$ is the labelled output corresponding to the union of the intermediate features set and the first feature set.

The feature transformer unit 120 in the depicted example is communicatively coupled to the dataset generator unit 118 and is configured to determine a feature transformer based on the second training dataset using a learning technique. The training procedure for generating or training the feature transformer may, in one embodiment be given by:

$$\text{TRAIN}(\Delta\theta^{(t)}, \kappa^{(t)}; D^{(t)}) \qquad (3)$$

where, TRAIN is representative of the training procedure, $\Delta\theta^{(t)}$ is the feature transformer, $\kappa^{(t)}$ is the classifier, and $D^{(t)}$ is the second training dataset which is used to determine the feature transformer $\Delta\theta^{(t)}$ and the corresponding classifier $\kappa^{(t)}$ by the training procedure TRAIN.

In one embodiment, a model loss cost function is minimized as an objective of the training procedure. If the deep learning network 102 is to be trained to perform classification, the model loss cost function includes a classification loss cost function. In such an embodiment, the deep learning network 102 is trained to learn the class separation boundaries in the feature space. If the deep learning network 102 is to be trained to provide separation among the classes, a center loss cost function is also included in the model loss cost function. That is, classification loss is augmented center loss. This composite loss explicitly forces the transformed features to have class-wise separation. In one embodiment, the classification loss function is given by:

$$C_{Classificaiton\ Loss} = \sum_{(x,y) \in D} \sum_{c \in [C]} y_c \cdot \log((\Psi_\kappa \cdot \Phi_\theta(x))_c) \quad (4)$$

where $D = \bigcup_{\tau \in t^{(t)}} (X_\tau, Y_\tau)$ is the second training dataset, $\Psi_\kappa$ is a classifier operator corresponding to the classifier κ, and $\Phi_\theta$ is feature extractor operator corresponding to the feature extractor θ.

Further, the center loss cost function is given by:

$$C_{Center\ Loss} = \sum_{(x,y) \in D} \sum_{c \in [C]} \|\Phi_\theta(x) - \mu_c\|_2 \quad (5)$$

where, $\mu_c$ is centroid of all the features corresponding to input data labelled as c. The model loss is given by:

$$C_{Model\ Loss} = C_{Classification\ Loss} + C_{Center\ Loss} \quad (6)$$

The deep learning network generator 122 is communicatively coupled to the feature transformer unit 120 and configured to generate the second set of parameters 128. The second set of parameters is given by:

$$\theta^{(t)} \triangleq \theta^{(t-1)} \cup \Delta\theta^{(t)} \quad (7)$$

where $\theta^{(t)}$ is the second set of classifier parameters, $\theta^{(t-1)}$ is the first set of classifier parameters and $\Delta\theta^{(t)}$ is the feature transformer parameters. The feature transformer $\Delta\theta^{(t)}$ is given by the mapping:

$$\Phi_{\Delta\theta^{(t)}} : F_\tau^{(t-1)} \to F_\tau^{(t)} \quad (8)$$

where, $F^{(t-1)}$ is the first feature set and the $F^{(t)}$ is the second feature set. The second feature extractor operator is given by:

$$\Phi_{\theta^{(t)}} \triangleq \Phi_{\Delta\theta^{(t)}} o \Phi_{\theta^{(t-1)}} \quad (9)$$

where, o is a cascade operator and $\Phi_{\Delta\theta^{(t)}}$ is feature transformer and $\Phi_{\theta^{(t-1)}}$ is first feature extractor operator. The second feature set is obtained as:

$$F^{(t)} = \Phi_{\Delta\theta^{(t)}}(\partial F^{(t)}) \cup \Phi_{\Delta\theta^{(t)}}(F^{(t-1)}) \quad (10)$$

i.e., the second feature set is obtained as a union of the transformed intermediate feature set and the transformed first feature set.

A pseudo code example of an implementation of the life-long learning technique is outlined in the Table-1 below. With respect to the outlined example, the present pseudo-rehearsal strategy is realized through the use of a finite memory module M equipped with READ( ), WRITE( ), and ERASE( ) procedures that can store a subset of F(t−1) and retrieve the same at time t. To limit the size of the memory footprint involved, only a subset of history (specified by sampling operator S) may be stored at every episode of lifelong learning. In practice two strategies that can be pursued for generating or deriving the subset include: (1) random sampling, in which a percentage of the memory is randomly retained, and (2) importance sampling, in which samples are retained that are farther from cluster centroids, given that center loss is optimized at every episode. In addition, storing low-dimensional features is more economical than storing entire images in terms of memory or storage footprint.

TABLE 1

| | |
|---|---|
| Input Training data $(X^{(t)}, Y^{(t)})$, $\forall t \geq 0$ | |
| Output $(\theta^{(t)}, \kappa^{(t)})$, $\forall t$ | |
| t ← 0, ERASE (M) | /* Set initial time, erase memory*/ |
| $D^{(0)} \leftarrow (X^{(0)}, Y^{(0)})$ | /*Obtain initial tasks and training data*/ |
| TRAIN($\theta^{(0)}, \kappa^{(0)}; D^{(0)}$) | /*Train initial network*/ |
| $F^{(0)} \leftarrow (\Phi_\theta^{(0)}(X^{(0)}))$ | /*Compute Features*/ |
| WRITE (M, S($F^{(0)}, Y^{(0)}$)) | /*Write Select Features to Memory*/ |
| while TRUE do | |
|   t ← t + 1, obtain $T^{(t)}, (X^{(t)}, Y^{(t)})$ | /* Obtain current tasks and data*/ |
|   Compute $\partial F^{(t)}$ using equation (1) | /*Compute old model features on new data*/ |
|   $(F^{(t-1)}, Y^{(t-1)}) \leftarrow$ READ (M) | /*Read previously computed features*/ |
|   Form $D^{(t)}$ using equation (3) | /*Form composite training data*/ |
|   TRAIN ($\Delta\theta^{(t)}, \kappa^{(t)}; D^{(t)}$) | /*Train feature transformer*/ |
|   $\Phi_\theta^{(t)} \leftarrow \Phi_{\Delta\theta}^{(t)} o \Phi_\theta^{(t-1)}$ | /*Obtain new feature extractor*/ |
|   Compute $F^{(t)}$ using equation (10) | /*Compute new features*/ |
|   ERASE (M) | /*Erase old features*/ |
|   WRITE (M,S($F^{(t)}, \bigcup_{t' \in [1,2,...,t]} Y^{t'}$)) | /*Write new select features*/ |
| end | |

In the depicted example, the memory unit 132 is communicatively coupled to the processor unit 130 and configured to store programs, training datasets, the first feature extractor, the first classifier, the second feature extractor and the second classifier. Although the memory unit 132 is shown as separate unit for clarity and for the purpose of explanation, the memory unit 132 may in practice be a part of the dataset generator unit 118, a feature transformer unit 120 and/or a deep learning network generator 122 or may, in practice, be a memory or storage used to store routines and/or parameters that implement some or all of these functionalities when executed. In one embodiment, the memory unit 132 may be a dynamic random-access memory (DRAM) device, a static random access memory (SRAM) device, flash memory or other memory devices. In another embodiment, the memory unit 132 may include a non-volatile memory or similar permanent storage device, media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices. The memory unit 132 may also be a non-transitory computer readable medium encoded with a program or other executable logic to instruct the one or more processors 130 to generate the first set of parameters 108, the second set of parameters 128 and so forth.

The processor unit 130 may include one or more processors either co-located within a single integrated circuit or distributed in multiple integrated circuits networked to share data and communication in a seamless manner. The processor unit 130 may, in one implementation, include at least one of an arithmetic logic unit, a microprocessor, a microcontroller, a general-purpose controller, a graphics processing unit (GPU), or a processor array to perform the desired computations or run the computer program. In one embodiment, the processor unit 130 may be configured to implement or otherwise aid the functionality of one or more of the dataset generator unit 118, a feature transformer unit 120, and/or a deep learning network generator 122. In some embodiments, the processor unit 130 may be representative of a FPGA, ASIC, or any other special purpose hardware configured to implement one or more of the dataset generator unit 118, a feature transformer unit 120, and/or a deep learning network generator 122.

Figure 2:
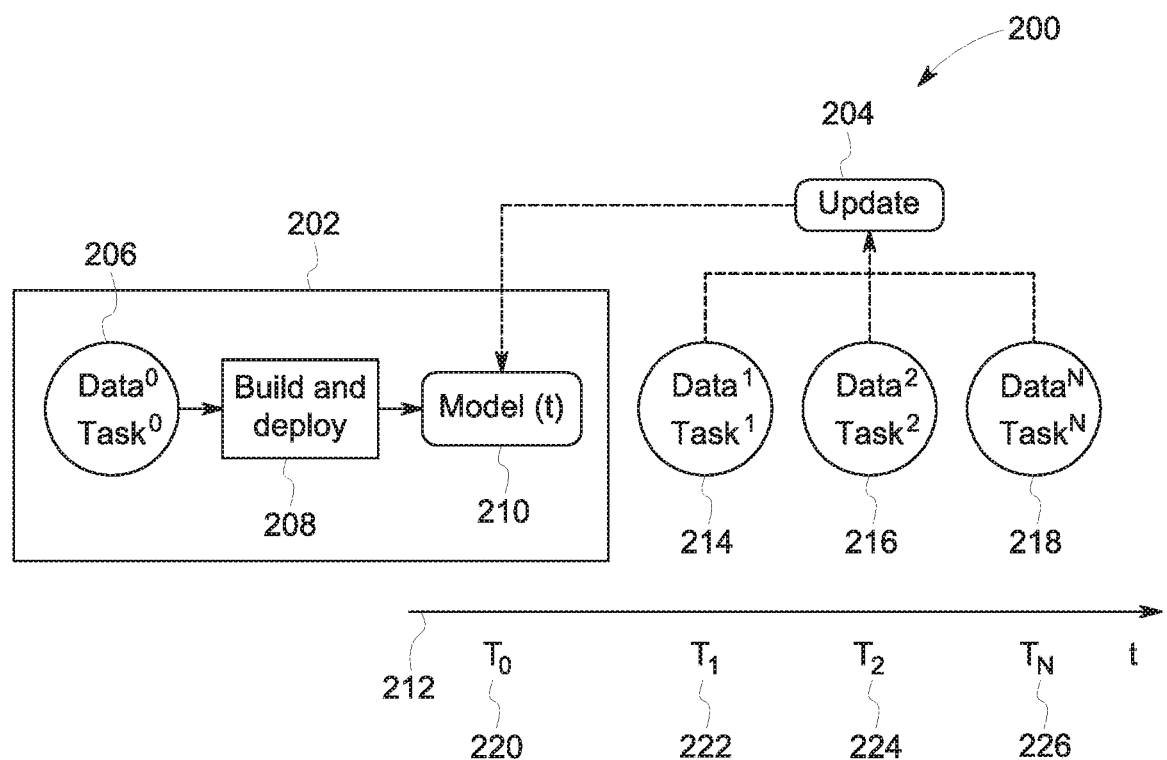
FIG. 2 is a schematic diagram illustrating life-long learning in accordance with aspects of the present specification.

FIG. 2 is a schematic diagram 200 illustrating life-long learning in accordance with aspects of the present specification. The schematic 200 includes a block 202 representative of initial building and deployment of a deep learning network 102 and a block 204 representative of periodical life-long update of the deployed deep learning network 102 based on new training datasets corresponding to newer task lists. Specifically, during initialization, first training dataset 206 (i.e., Data$^0$) corresponding to a first task list (i.e., Task$^0$) is used to train the deep learning network 102, which is then deployed for use as illustrated in block 208. A first set of parameters is generated from the training. The deep learning network 102 is represented as model in block 210. The schematic 200 includes a time axis 212 representing multiple time instants when the model 210 is updated. In the illustrated embodiment, the model 210 is initially generated (i.e., $T_0$) or updated (i.e., $T_1$, $T_2$, and so forth) at four time instants 220, 222, 224 and 226. The initial build and deployment of the deep learning network 102 is performed at initial first time instant 220 ($T_0$).

At a subsequent second time instant 222, a second training dataset 214 corresponding to a second task list is available. A second set of parameters is generated at the update block 204 as explained with reference to FIG. 1. The model 210 is updated based on the second set of parameters. Similarly, at third instant 224, a third training dataset 216 corresponding to a third task list is available. The update procedure is repeated at 204 to generate a third set of parameters corresponding to the third time instant 224. The time instant 226 is representative of a generic Nth time instant 226 where Nth training dataset 218 corresponding to a Nth task list is available. The deep learning network 102 represented is modified using Nth set of parameters generated by the update block 204 using the Nth training dataset 218. It may be noted that the schematic 200 illustrates the aspects of a life-long learning framework as disclosed in FIG. 1, amenable to be used in various learning scenarios with changing data distributions and task lists in the training datasets 214, 216, 218.

Figure 3:
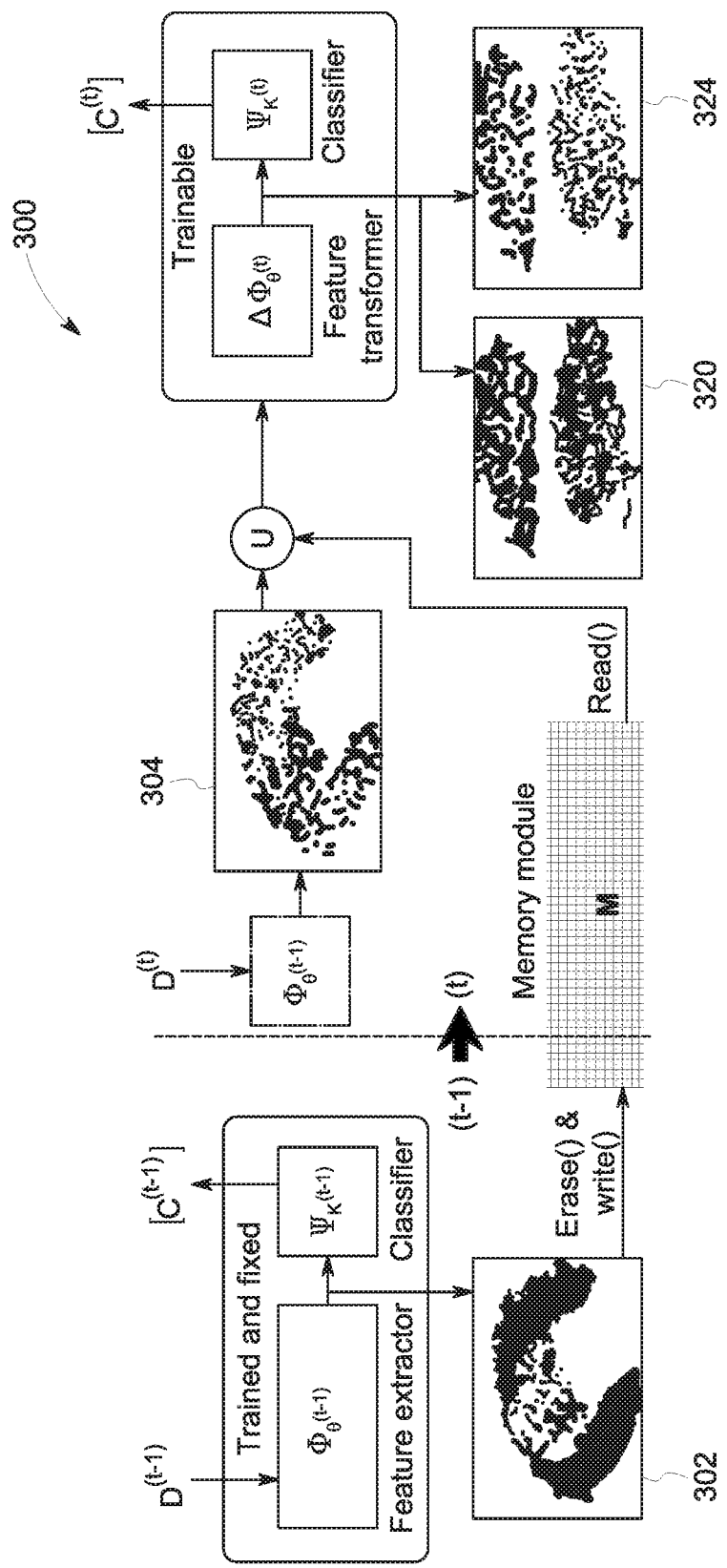
FIG. 3 is schematic diagram illustrating feature transformation in accordance with aspects of the present specification.

FIG. 3 is schematic diagram 300 illustrating feature transformation in accordance with aspects of the present specification. The depicted plots 302 each include an x-axis and a y-axis representative of mean compensated normalized values. More particularly, and with the preceding discussion in mind, FIG. 3 shows feature transformers in action using Pneumothorax classification. In this example, a binary classifier was trained on 6,000 images at time index (t−1). As shown by the t-SNE plot 302, the feature extractor $\Phi_{\theta^{(t-1)}}$ produces features which are well-separated and which are stored in memory M. However, at time t, when a set of 2,000 new images is encountered, $\Phi_{\theta^{(t-1)}}$ produces features that are scattered (t-SNE plot 304). As taught herein. the feature transformer learns a new representation using the (well-separated) features in M as well as poorly separated features (from the new data). This ensures good class separation for all images encountered until time t (t-SNE plots 320 and 324). This is repeated for all time indices t.

Figures 4, 5:
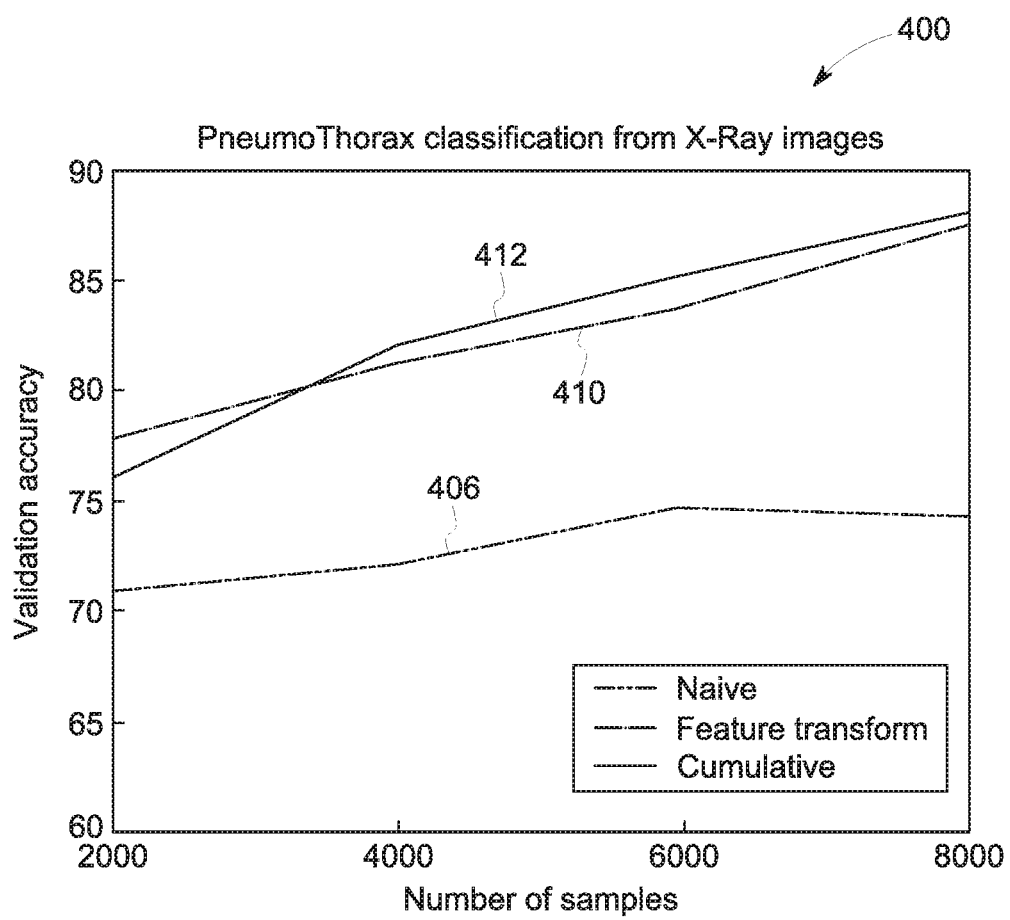
FIG. 4 is a graph illustrating the enhanced performance of a feature transformation technique in accordance with aspects of the present specification.
FIG. 5 is a table illustrating performance and information capacity tradeoff achieved by feature transformation in accordance with aspects of the present specification.

FIG. 4 is a graph 400 illustrating the enhanced performance of feature transformation in accordance with aspects of the present specification. The graph 400 includes an x-axis representative of number of samples and a y-axis representative of validation accuracy. The graph 400 was generated using a subset of a chest X-ray dataset having a large dataset of chest X-rays labeled with corresponding diagnoses. In particular, incremental learning was simulated by providing 8,000 training images in incremental batches of 2,000 and measured the performance on a withheld validation set of 2,000 images, which mimics a practical scenario of a model deployed to detect pneumothorax in a hospital with data arriving incrementally.

The curves of the graph 400 were generated using data generated from continual learning simulations using techniques as discussed in the present specification as well as known conventional techniques (i.e., naïve learner and cumulative learner). A VGG (Visual Geometry Group)-network was used as a base network in the simulations. Up to two dense layers were added to the base network in each feature transformer step. The feature transform network essentially had one additional dense layer per step. Features from different layers of the VGG-network (pooling layers—3 & 4 and fully connected layers—1 & 2) are stored in the memory 132 and used subsequently for training.

The graph 400 compares performance of the different approaches on the validation dataset and includes a first curve 406 corresponding to a naive training and a second curve 410 corresponding to a feature transform based learning approach. The graph 400 further includes a third curve 412 corresponding to cumulative training using the previously stored training datasets. In particular, FIG. 4 captures the performance of feature transformer approach with the base features being extracted from first pooling layer (here block3_pool). After the fourth batch of data, performance of feature transformers almost matches the performance of cumulative training. This performance is achieved despite not having access to the full images but only the stored features. Further, the enhanced validation accuracy of curve 408 with reference to the curve 406 validates superior performance of the center loss cost function.

FIG. 5 is a table 500 illustrating performance and information capacity tradeoff achieved by feature transformation in accordance with aspects of the present specification and with respect to the study described with respect to FIG. 4. In particular, the table of FIG. 5 provides a comparison of feature transformers from different base layers and thereby presents the performance of the feature transformer approach depending upon the base features used. It may be observed that performance is lowest for the layer that is closer to the classification layer—fc_2. This is intuitively satisfying because, the further layers in a deep neural network will be more finely tuned towards the specific task and deprives the feature transform of generic features.

Figure 6:
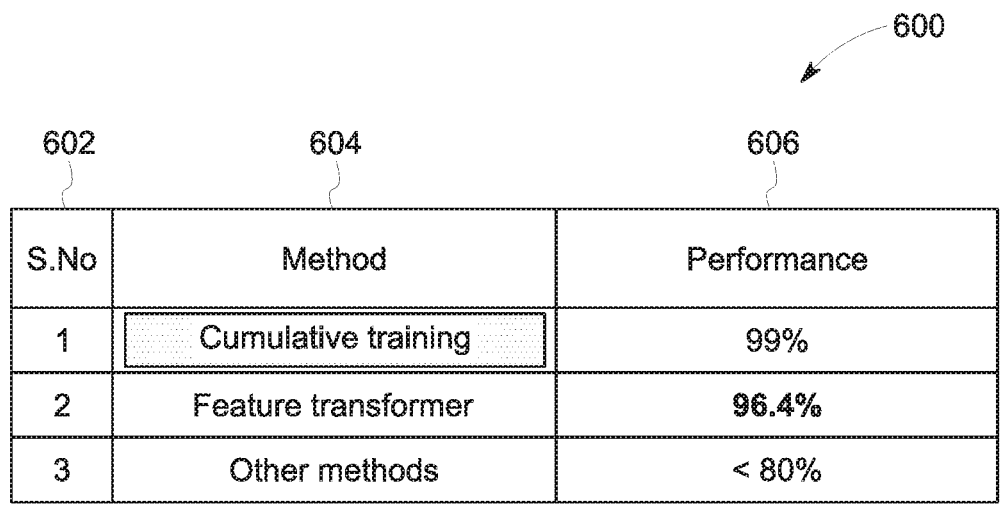
FIG. 6 is a table illustrating performance of the life-long learning system of FIG. 1 in accordance with aspects of the present specification.

FIG. 6 is a table 600 illustrating performance of a life-long learning system as shown in FIG. 1 in accordance with aspects of the present specification. The table 600 includes a first column 602 representative of serial number or other index values, a second column 604 representative of a respective deep learning technique adopted, and a third column 606 representing validation accuracy in percentage points. The entries of table 600 were computed using a MNIST (Modified National Institute of Standards and Technology) rotations dataset. In generating the table 600, twenty batches of data were created from a standard MNIST dataset, with rotation angle varying from 0° to 360°. A basic three layer convolution architecture was used followed by two fully connected layers as the base network. The feature transformer network involved added one extra dense layer per task. These simulations exhibit that state-of-the-art performance is achieved using this dataset, even after considering all the twenty tasks of the task list. The table shows that conventional learning techniques (row 3) such as, but not limited to, a gradient episodic memory, provides a performance of about 80%. It may be observed that the performance of life-long learning (i.e., feature transform) of the present specification provides a performance of 96% match.

Figure 7:
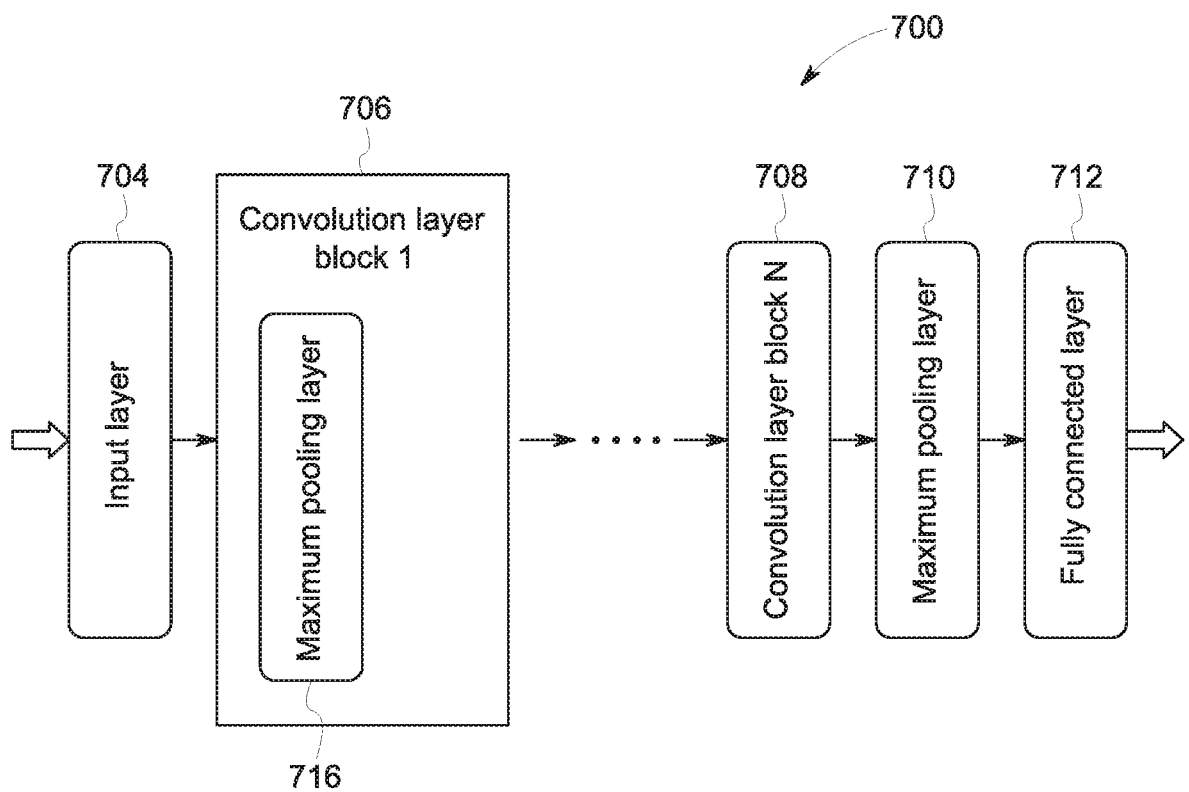
FIG. 7 is a structure of one example of a deep learning network used for life-long learning in accordance with aspects of the present specification.

FIG. 7 depicts an example of a structure 700 of a deep learning network used for life-long learning in accordance with aspects of the present specification. The structure 700 includes an input layer 704, a plurality of convolution layers 706, 708 and a fully connected layer 712. A pooling layer 716 is also present in cascade with the convolution layer block 1. Similar pooling layers are also present with each of the other convolution layers. Further, an additional maximum pooling layer 710 is used to process the data before providing to the fully connected layer 712. In one embodiment, the structure 700 is used as a base network and additional one or more of fully connected layers and dense layers may be included to realize the feature transform.

Figures 8, 9:
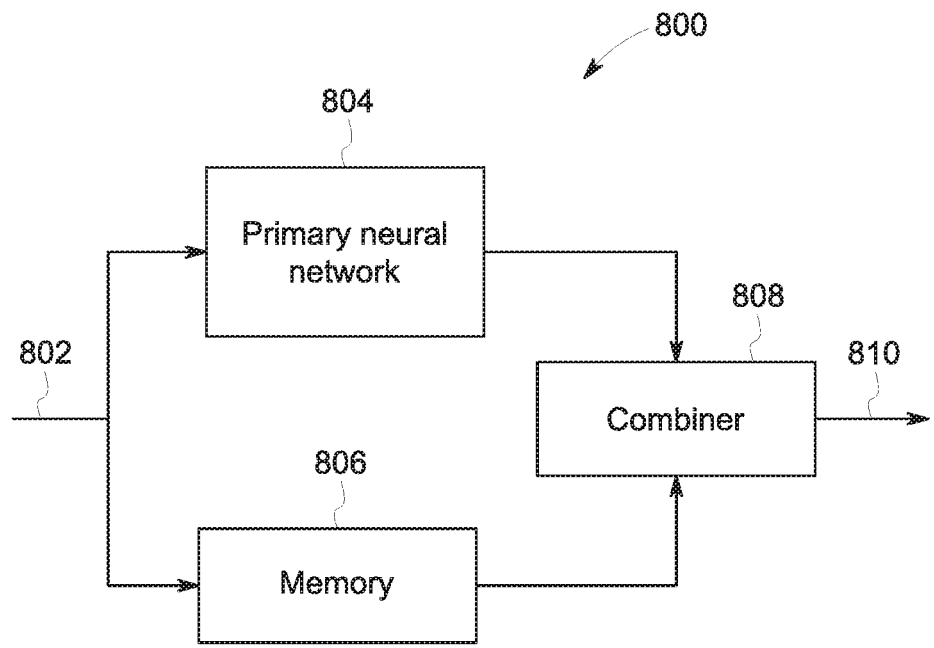
FIG. 8 is a block diagram of a memory augmented neural network (MaNN) used in a life-long learning system in accordance with aspects of the present specification.
FIG. 9 is a table illustrating the performance of the life-long learning system of FIG. 1 in accordance with aspects of the present specification.

FIG. 8 is a block diagram 800 of an example of a memory augmented neural network (MaNN) suitable for use in a life-long learning system in accordance with aspects of the present specification. The block diagram 800 includes a primary neural network 804 which may correspond to any conventional neural based deep learning network. Further, the MaNN also includes a memory module 806 communicatively coupled to receive an input dataset 802 and disposed in parallel with the primary neural network 804. The MaNN also includes a combiner 808 configured to combine a first output from the primary neural network and a second output of a memory unit 806. The MaNN is configured to use the memory module 806 to remember relevant information obtained from a small set of examples and may provide better inference even when the training data set is of smaller size. The life-long learning technique of the present specification may be implemented using such a MaNN structure.

FIG. 9 is a table 900 illustrating performance of the life-long learning system of FIG. 1 in accordance with aspects of the present specification. The table 900 includes a first column 902 having a list of tasks, a second column 904 listing characteristics of an iCAR (Incremental Classifier and Representation) learning technique. Similarly, the table 900 includes a third column 906, a fourth column 908, a fifth column 910, a sixth column 912, and a seventh column 914 representing, respectively, features of an EWC (Elastic Weight Consolidation), a GEM (Gradient Episodic memory), synaptic intelligence, fine tuning, and feature transform learning techniques. It may be observed from the table 900 that the proposed life-long learning technique exhibits improved performance compared to other techniques in aspects of adding new tasks, privacy, incrementally adding new tasks, improvising the performance with reference to a same task with new data, and episodic data.

Figure 10:
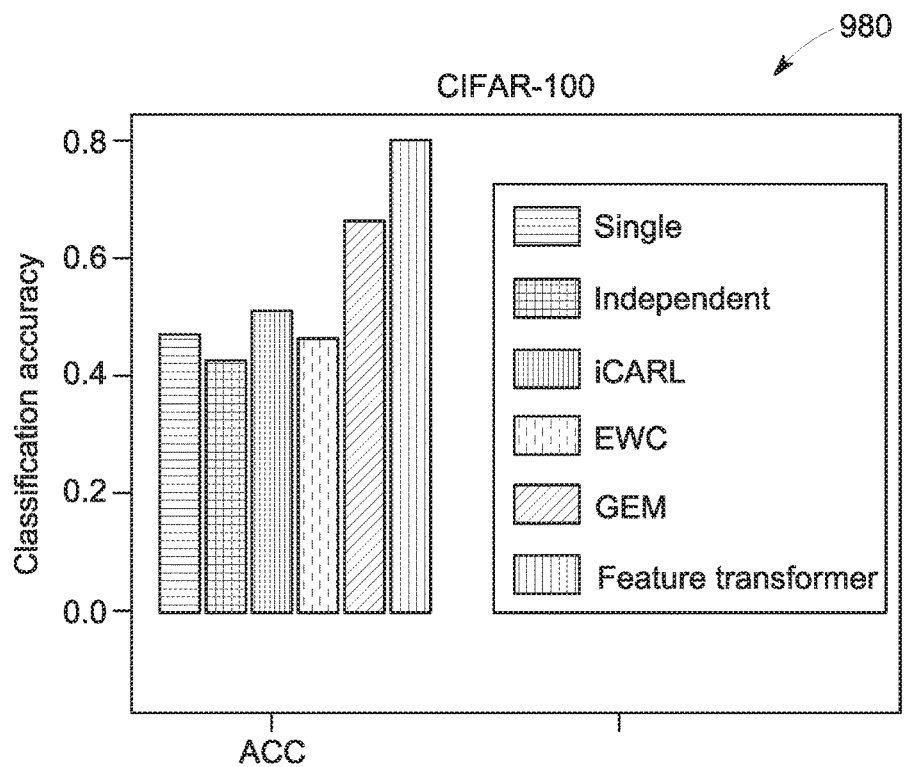
FIG. 10 is a first bar chart illustrating the performance of the life-long learning system of FIG. 1 in accordance with aspects of the present specification.
Figure 11:
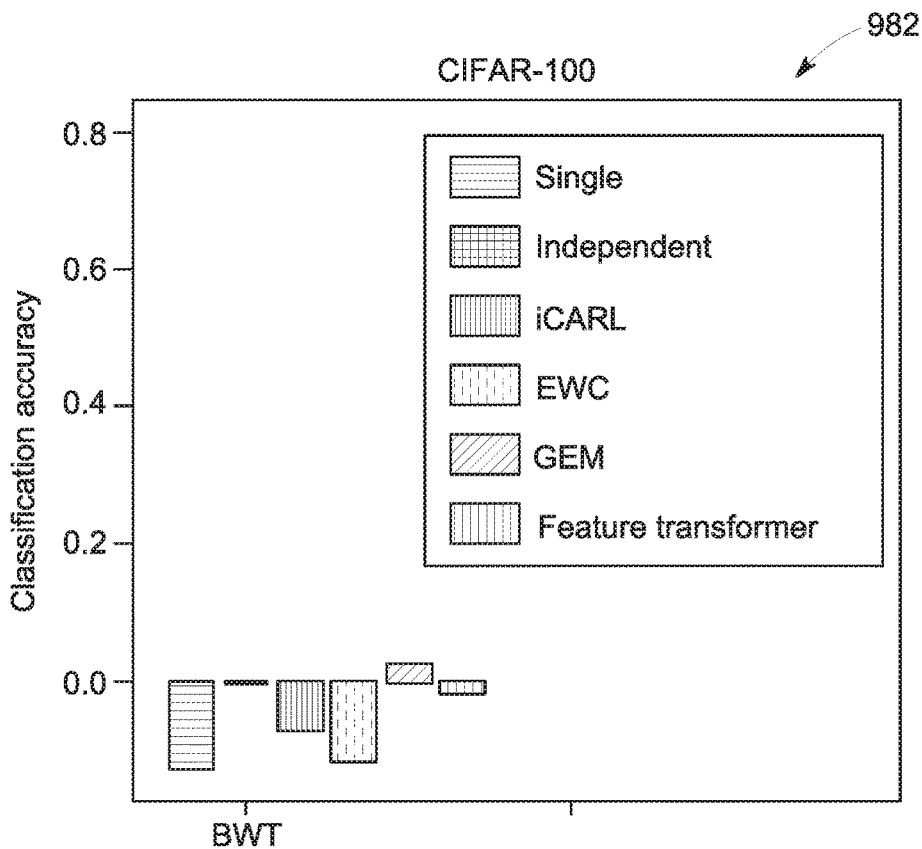
FIG. 11 is a second bar chart illustrating the performance of the life-long learning system of FIG. 1 in accordance with aspects of the present specification.

FIGS. 10 and 11 are graphs illustrating performance of the life-long learning system of FIG. 1 in accordance with aspects of the present specification. FIG. 10 depicts a first bar chart 980 that corresponds to classification accuracy of a plurality of learning schemes. The columns represent accuracy of single, independent, iCARL, EWC and GEM learning techniques. The right-most column is representative of classification accuracy of a feature transform based learning technique as discussed herein. It may be noted from the first bar chart 980 that the feature transform based learning technique offers improved classification accuracy among all the illustrated learning techniques.

As depicted in FIG. 11, the second bar chart 982 corresponds to backward transfer performance of the plurality of learning schemes. As used herein, backward transfer (BWT) is a quantitative metric that measures catastrophic forgetting on older tasks after learning new tasks. The columns represent backward transfer performance of single, independent, iCARL, EWC and GEM learning techniques. The right-most column is representative of backward transfer performance of a feature transform based learning technique as presently discussed. It may be noted that the performance of feature transform based learning technique is good in absolute terms and outperforms most of the conventional learning techniques. As shown by the combination of FIGS. 10 and 11, use of feature transformers provide an improvement of >15% while showing negligible catastrophic forgetting.

Figure 12:
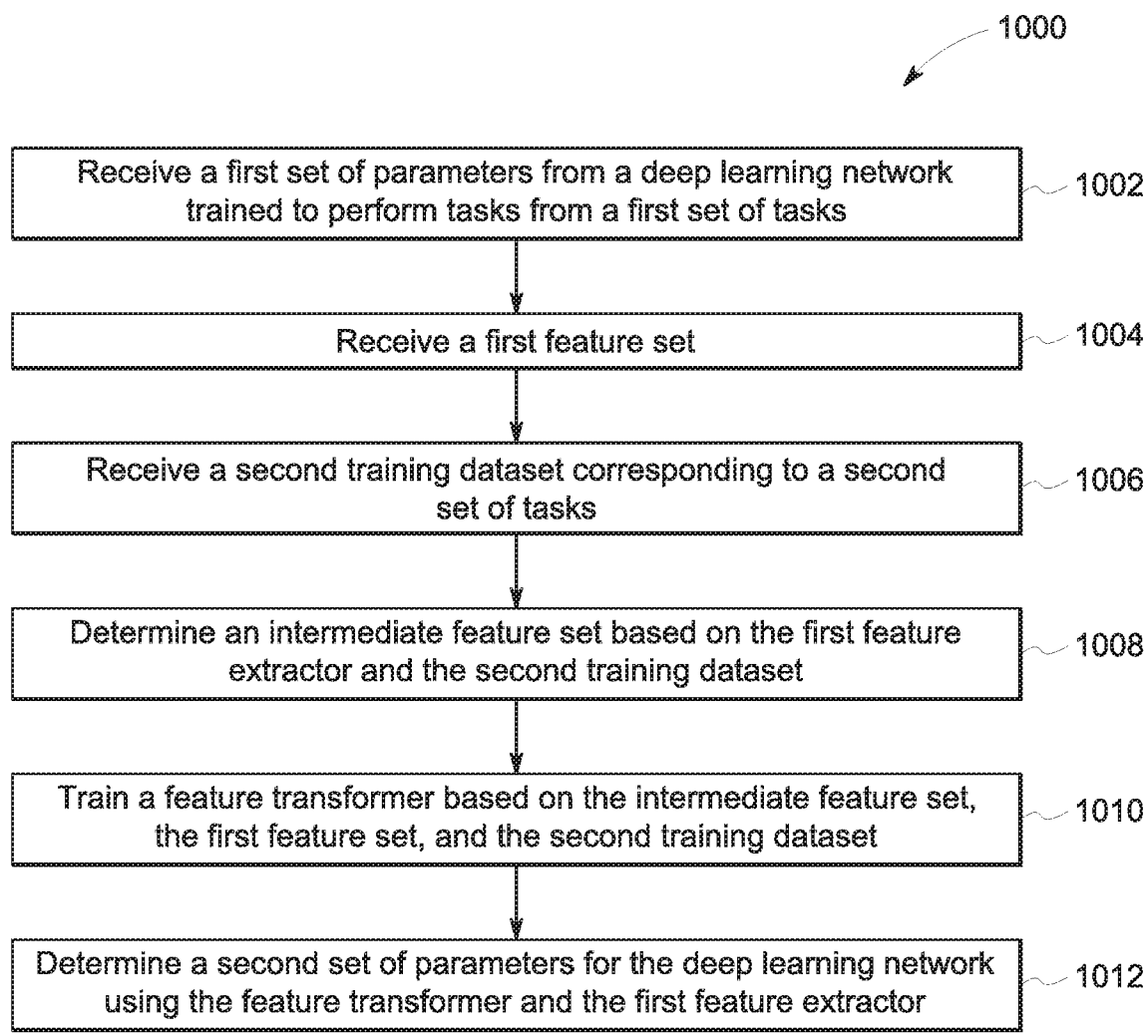
FIG. 12 is a flow chart of a life-long learning method in accordance with aspects of the present specification.

FIG. 12 is a flow chart 1000 of a life-long learning method in accordance with aspects of the present specification. The method 1000 in this example of an implementation includes the step 1002 of receiving a first set of parameters from a deep learning network trained, using a first training dataset, to perform a first set of tasks. The deep learning network in such an embodiment may include a first feature extractor and a first classifier. The method 1000 further includes the step 1004 of receiving a first feature set determined based on the first training dataset and the first feature extractor. At step 1006, a second training dataset corresponding to a second set of tasks is received. At step 1008, an intermediate feature set is determined (as per equation (1)) for determining a feature transformer. This determination may be based on or otherwise utilize the first feature extractor and the second training dataset. The method 1000 also depicts, in this implementation, a step 1010 of training (as per equation (3)) the feature transformer based on the intermediate feature set, the first feature set and the second training dataset. As discussed herein, equation (2) may be used to generate the training data set required for the training performed in accordance with equation (3). Finally, the method 1000 includes a step 1012 of determining or generating a second set of parameters for the deep learning network using the feature transformer and the first feature extractor. The modified or retrained deep learning network comprises, in one embodiment, a second feature extractor and a second classifier.

While memory management has been described above, it may also be noted that additional steps may also be taken to control the growth of network capacity. For example, the present framework can be formulated as a base feature extractor and feature transformer layers, adapting the features for new tasks. In order to check the growth of feature transformer layers, the base feature extractor remains fixed and only the base features are stored and not the latest updated features. This makes existing feature transformer layers reusable for future episodes.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description.

What is claimed is:

1. A method for updating a deep learning network over time, comprising the steps of:
 receiving a first set of parameters from a deep learning network, wherein the deep learning network is trained using a first training dataset to perform a first set of tasks, wherein the first set of parameters specify both a first feature extractor and a first classifier used to perform the first set of tasks;
 receiving a first feature set corresponding to the first training dataset;
 receiving an input comprising a second set of tasks and a second training dataset;
 generating a second set of parameters specifying both a second feature extractor and a second classifier for use by the deep learning network, wherein the second set of parameters are generated using the first set of parameters, the input, and the first feature set, and the first training dataset is not used in generating the second set of parameters; and
 modifying the deep learning network to use the second set of parameters so that the deep learning network is trained to perform tasks from the first set of tasks and the second set of tasks without degradation.

2. The method of claim 1, wherein the deep learning network comprises a memory augmented neural network.

3. The method of claim 2, wherein the first feature set is stored in a memory of the memory augmented neural network.

4. The method of claim 1, wherein the deep learning network is trained to process one or more of medical images or industrial images.

5. The method of claim 1, wherein the first set of parameters are generated by training the deep learning network to perform the first set of tasks using the first training dataset.

6. The method of claim 1, wherein the second set of parameters enables the deep learning network to perform the tasks from the first task list at a same level as the deep learning network performed the tasks from the first task list prior to generating the second set of parameters.

7. The method of claim 1, wherein the steps of the method are performed on a learning unit associated with the deep learning network and implemented using one or more processor units and at least one memory unit of the learning unit.

8. The method of claim 7, wherein the learning unit comprises a data set generator configured to receive at least the first set of parameters, the first feature set, and the second training dataset and to generate an intermediate feature set based on the first feature extractor and the second training dataset.

9. The method of claim 7, wherein the learning unit comprises a feature transformer unit configured to train a feature transformer based at least on the second training dataset.

10. The method of claim 9, wherein the feature transformer is trained by minimizing a model loss cost function.

11. The method of claim 7, wherein the learning unit comprises a deep learning network parameter generator configured to generate the second set of parameters based at least on a feature transformer.

12. A system, comprising:
 a deep learning network initially trained using a first training dataset to perform a first set of tasks;
 a learning unit in communication with the deep learning network, the learning unit comprising:
  one or more memory components storing data and computer logic;
  one or more processors configured to execute computer logic stored on the one or more memory components so as to cause acts to be performed comprising:
   receiving a first set of parameters from the deep learning network, wherein the first set of parameters specify both a first feature extractor and a first classifier used to perform the first set of tasks;
   receiving a first feature set corresponding to the first training dataset;
   receiving an input comprising a second set of tasks and a second training dataset;
   generating a second set of parameters specifying both a second feature extractor and a second classifier for use by the deep learning network, wherein the second set of parameters are generated using the first set of parameters, the input, and the first feature set, and the first training dataset is not used in generating the second set of parameters; and
   modifying the deep learning network to use the second set of parameters so that the deep learning network is trained to perform tasks from the first set of tasks and the second set of tasks without degradation.

13. The system of claim 12, wherein the one or more memory components and one or more processors facilitate the operation of or implement a dataset generator configured to receive at least the first set of parameters, the first feature set, and the second training dataset and to generate an intermediate feature set based on the first feature extractor and the second training dataset.

14. The system of claim 12, wherein the one or more memory components and one or more processors facilitate the operation of or implement feature transformer logic configured to train a feature transformer based at least on the second training dataset.

15. The system of claim 14, wherein the feature transformer is trained by minimizing a model loss cost function.

16. The system of claim 12, wherein the one or more memory components and one or more processors facilitate the operation of or implement a deep learning network parameter generator configured to generate the second set of parameters based at least on a feature transformer.

17. The system of claim 12, wherein the deep learning network comprises a memory augmented neural network.

18. The system of claim 12, wherein the deep learning network is trained to process one or more of medical images or industrial images.

19. The system of claim 12, wherein the first set of parameters are generated by training the deep learning network to perform the first set of tasks using the first training dataset.

20. The system of claim 12, wherein the second set of parameters enables the deep learning network to perform the tasks from the first task list at a same level as the deep learning network performed the tasks from the first task list prior to generating the second set of parameters.

* * * * *